(No Model.)

F. L. O. WADSWORTH.
TELEMETER.

No. 531,705. Patented Jan. 1, 1895.

Witnesses:

Inventor.
Frank L. O. Wadsworth,
By Geo. H. Whitney
Attorney.

UNITED STATES PATENT OFFICE.

FRANK LAWTON OLCOTT WADSWORTH, OF WASHINGTON, DISTRICT OF COLUMBIA.

TELEMETER.

SPECIFICATION forming part of Letters Patent No. 531,705, dated January 1, 1895.

Application filed January 9, 1894. Serial No. 496,297. (No model.)

*To all whom it may concern:*

Be it known that I, FRANK LAWTON OLCOTT WADSWORTH, a citizen of the United States, residing at Washington, in the District of Columbia, have invented certain new and useful Improvements in Telemeters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the art of measuring distances and it consists in a method of determining the same by means of an improved telescope, which, when used in connection with a rod provided with two marks or targets fixed thereon at a predetermined distance apart, will enable the distance of said rod from the telescope to be quickly and accurately determined by the observer.

The special feature which constitutes my improvement is the introduction of two movable cross wires and the use of a micrometer screw or equivalent means for moving and indicating the amount of separation of said cross wires. It is preferred to move both wires simultaneously, toward or away from the center of the field, so as to bring them into coincidence with the images of the two targets. When this has been accomplished the distance of the rod is easily ascertained, since the ratio of this distance to the focal length of the telescope is the same as the ratio of the distance between the targets to that between the cross wires. The two latter quantities being known and also the focal length of the telescope, it is a simple matter to calculate the distance of the rod.

Figure 1:
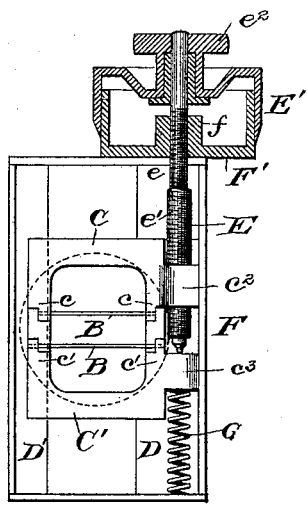
Figure 2:
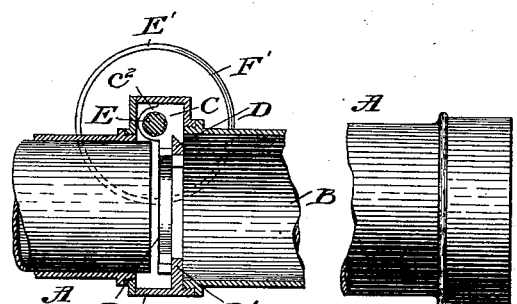

In the drawings, Figure 1 is an elevation of a device for moving the cross wires in my improved telescope. Fig. 2 is a cross section of the same on the axis of the telescope, and Fig. 3 is a diagram explaining the operation of the instrument.

The telescope A may be of any usual construction, and may be focused by a motion either of the eye piece tube or the objective. The movable double cross wires B B' are mounted in the focal field of the objective on carriers C C' which are fitted to slide on guides D D', transverse to the axis of the telescope. The wires are parallel, and are symmetrically disposed above and below the center of the field of the telescope. The guides are made straight and true, so as to preserve the parallelism of the wires as the carriers slide to and fro. The carriers have one edge cut away so as to form projecting arms $c\ c'$ to which the ends of the cross wires are secured. The arms are rabbeted or shouldered, so as to overlap when the carriers are brought close together, and thus bring the wires in line with each other at the center of the field. The cut away edges of the carriers leave the greater portion of the field unobstructed even when the wires are thus brought into line.

Various means are available for moving the carriers. In order to avoid the liability of error arising from inaccuracies in the screw threads of a right and left hand screw I prefer the construction shown, in which the screw E has a thread $e$ working in a stationary nut $f$ at one end of the casing F in which the parts are inclosed, and a thread $e'$ of twice the pitch of the thread $e$, working in a tapped boss $c^2$ on the carrier C. The end of the screw abuts against a lug $c^3$ on the carrier C', and a spring G abutting against the other side of the lug keeps it always in close contact with the screw. The threads $e, e'$ may be either right hand or left hand, but must be alike in this respect. The outer end of the screw has a head $e^2$ by which to turn it, and a micrometer head E' is secured to it, co-operating with a stationary graduated cylinder F'. When the screw is turned in one direction it pushes the carrier C' away from the center of the field against the tension of the spring, and at the same time draws the carrier C in the other direction at the same rate of speed, because the thread $e'$ is twice the pitch of the thread $e$. The separation of the two carriers is due solely to the thread $e'$, and so the error from imperfect cutting of the thread is reduced to a minimum.

Figure 3:
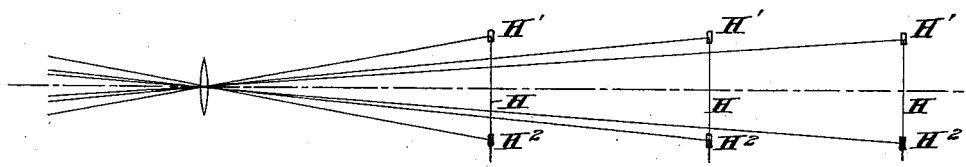

The mode of using this instrument is illustrated in Fig. 3. A rod H, carrying two targets H' H² fixed at a carefully measured distance apart, say ten or twelve feet, is sighted by the observer, who then turns the screw which is parallel to the rod until the two cross wires coincide with the two targets as seen in the field of the telescope. The distance of the rod is then readily ascertained by reading the micrometer, which if desired may be so graduated as to give directly the distance of the rod in feet or yards. It will be observed that this method differs essentially from the ordinary stadia method in which both wires are fixed and the distance is determined either by moving one of the targets until the images of the two coincide with the two stadia wires, or by reading off on a rod, suitably graduated, the distance intercepted by the two fixed wires.

In my instrument the length of the rod, viz: the distance between the two targets, remains constant, and the wires are brought into simultaneous coincidence with the two targets as hereinbefore described, the advantage of this method being that the determination may be effected with greater accuracy and with greater rapidity, only one setting being required and the use of a tripod or other support for the observing telescope being rendered unnecessary.

I am aware that a telescope has been provided with stadia hairs mounted in levers supported in a case inside of the tube, each lever having an adjusting screw accessible through a hole in the tube; but this construction is simply for the purpose of correcting any error in the position of the stadia hairs, which, when once properly adjusted are not again disturbed. It is not intended to alter their positions while the telescope is in use, nor are there any means shown by which such an adjustment can be practically accomplished, since the adjusting screws are entirely inside of the telescope tube and can be reached only by removing two screw plugs from the holes in the tube and inserting a small screw driver, first into one hole and then into the other. There is no provision for adjusting the two hairs simultaneously, so as to bring them into coincidence with two observed objects.

Having thus described my invention, what I claim, and desire to secure by Letters Patent, is—

1. The combination with a telescope, of two carriers cut away to form projecting arms, double cross wires mounted on said arms, and means for simultaneously adjusting said carriers, substantially as described.

2. The combination with a telescope, of two carriers having arms rabbeted so as to overlap, and cross wires mounted on said arms, substantially as described.

3. The combination with a telescope, of two carriers, cross wires on said carriers, and a screw provided with two similar threads having one thread working in a stationary nut and the other in a boss on one of said carriers, the end of the screw abutting against the other carrier, substantially as described.

4. The combination with a telescope, of two carriers, cross wires mounted thereon, a screw having two threads, one engaging with a stationary nut, and the other thread of twice the pitch of the first, working in a boss on one of said carriers, the end of the screw abutting against the other carrier, and means for keeping said screw and carrier in contact, substantially as described.

5. The combination with a telescope, of a casing F containing guides D D', carriers C C' sliding on said guides, cross wires B B' mounted on said carriers, a screw E having a thread $e$ engaged with a stationary nut, and a thread $e'$ of twice the pitch of thread $e$ engaged with a tapped boss on the carrier C, and a spring G pressing the carrier C' against the screw E, substantially as described.

In testimony whereof I affix my signature in presence of two witnesses.

FRANK LAWTON OLCOTT WADSWORTH.

Witnesses:
FRANK D. BLACKISTONE,
GEO. P. WHITTLESEY.